April 20, 1948.  F. C. WALLACE ET AL  2,440,032
JET SHAFT SEAL
Filed April 29, 1947

INVENTORS
FRANK C. WALLACE
ROBERT E. FOSTER
BY *Mason Graham*
ATTORNEYS

Patented Apr. 20, 1948

2,440,032

UNITED STATES PATENT OFFICE 2,440,032

JET SHAFT SEAL

Frank C. Wallace, North Hollywood, and Robert E. Foster, Glendale, Calif., assignors to Monogram Manufacturing Company, Los Angeles, Calif., a corporation of California Application April 29, 1947, Serial No. 744,610

10 Claims. (Cl. 286—9)

The present invention relates to a shaft seal, and more particularly to a seal for sealing the shafts of liquid pumps of the type used for pumping heavy and corrosive liquids, and those containing suspended solids.

In the pumping of liquids, and particularly liquids of the type which are difficult to seal against loss by the use of ordinary sealing devices, such as liquids containing suspended or entrained abrasives, acids and caustics, several types of seals have been developed. None of these, however, has been entirely satisfactory for all liquids, due to the fact that in most of such seals relatively close tolerances of fit have been required. In such cases the material being pumped is apt to cut or otherwise attack the surfaces forming the sealed joint, and thereby greatly shorten the life of the seal, requiring frequent maintenance and replacement of parts, with the attendant shutdowns of operations, and loss of valuable production time.

An object of the present invention is to make an improved shaft seal for liquid pumps.

Another object is to make a shaft seal for a liquid pump wherein the pressure differential between the high and low pressure sides of the pump is employed to produce a jet action which produces a suction at a shaft joint, thereby sealing the joint against liquid loss.

Another object is to make a liquid pump having a pressure differential shaft seal with axial flow means mounted to reduce pressures at a critical point of flow relatively to the seal.

Another object is to make an improved seal for liquid pumps wherein difference in pressure between the high and low pressure sides of the pump is employed to prevent leakage of liquid from the pump.

Another object is to make a narrow annular passage surrounding the shaft of a liquid pump, the passage being in open communication with the high and low pressure sides of the pump, this passage communicating with a bearing area of the pump shaft to produce a negative pressure on said bearing area, thereby to prevent loss of liquid from the pump housing.

Another object is to produce, during operating periods of a liquid pump, a negative pressure on a shaft sealing area and to provide a floating sealing member positioned to seal the shaft by movement of the sealing member due to pressure against a face thereof when the pump is in non-operating condition, and in some operating conditions.

These and other objects of the invention will be brought out more fully in the following description and the accompanying drawings, comprising one sheet. In the drawings.

Figure 1:
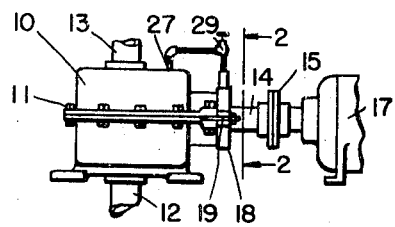
Fig. 1 is a view in side elevation in reduced scale of a liquid pump embodying the present invention connected to an electric drive motor.

Referring to the drawings in detail, a liquid pump 10 is of the type having a split casing, the two halves of which are connected to each other by flange bolts 11. The pump has a low pressure inlet line 12 and a high pressure outlet line 13. The pump may be of any suitable type having a rotatable shaft 14. The structural details of the pump are purposely omitted as being not pertinent to the present invention, since the seal comprising the present invention will operate satisfactorily to seal any shaft joint where liquid at different pressures is available.

The pump is adapted to be driven through a flexible connection 15 by an electric motor 17 or other suitable drive means.

A ring housing 18 is secured to the end of the pump casing as by means of clamp bolts 19. The ring housing is generally cup-shaped and has an internally threaded flanged portion 20. A pair of upstanding liquid inlet connections 21 and 22 are provided, one on each side of the seal housing 18 and open into an annular groove 23 in the housing. The annular groove 23 has a lip 24 formed on its inner edge and with a tapered opening 25 centrally thereof. The upstanding liquid inlets 21 and 22 are adapted selectively to connect the interior of the housing 18 to a liquid high pressure zone such as at 27, by means of piping 28 and a manually controlled valve 29. The inlet 21 or 22, which is not used for making the particular connection required in each instance, is closed by a pipe plug 30 (see Fig. 2).

A jet adjusting plate 31 is threaded peripherally and is adapted to screw into the threaded flanged portion 20 of the seal housing 18. This adjusting plate is provided with a recess 32 in its outer face to receive a usual type of spanner wrench. The plate has an inwardly projecting tapered flange 33, the outer face of which is adapted to lie closely adjacent to the tapered inner face of the central opening 25 in the housing 18. The central or inner tapered face of the flange 33 is adapted to have a slight and adjustable clearance from the similarly tapered periphery of the sleeve 34 which is secured to, and in effect comprises a part of, the pump shaft 14.

A locking ring 35 is adapted to seat against the external face of the jet adjusting plate 31 to lock it in adjusted position. The outer and inner peripheral edges respectively of the jet adjusting plate 31 and the locking ring 35, are beveled to receive a hydraulic sealing ring 37 therebetween. The ring 37 seals against seepage of air or liquid past the marginal edge of the plate 31. The jet adjusting plate 31 has an annular groove 38 in which a sealing gasket 39 is mounted loosely. A clamp ring 40 for securing the sleeve 34 in adjusted position on the shaft 14 is threaded onto the external end of the sleeve 34 and is secured in adjusted position by a set screw 41. The inner end of the ring 40 is adjusted to lie in the same plane, normal to the axis of the pump shaft 14, as the outer face of the annular groove 38 so that the sealing gasket 39 will readily engage both of these surfaces simultaneously when subjected to pressure from the interior of the pump.

An axial flow impeller 42 may be of plastic or other suitable material and may be moulded or otherwise mounted in a dovetailed groove 43 formed in the periphery of the inner end of the sleeve 34.

The clearance between the tapered inner opening 25 of the seal housing 18 and the correspondingly tapered outer face of the jet adjusting flange 33 will control the flow of liquid through the space between these members. Endwise adjustment of the shaft 14 and its supported sleeve 34 likewise will control the clearance between the tapered inner face of the jet adjusting flange 33 and the correspondingly tapered surface of the sleeve 34.

Figure 2:
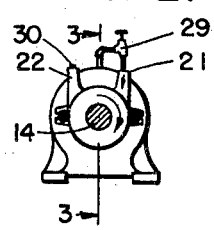
Fig. 2 is a sectional view on the line 2—2 of Fig. 1.
Figure 3:
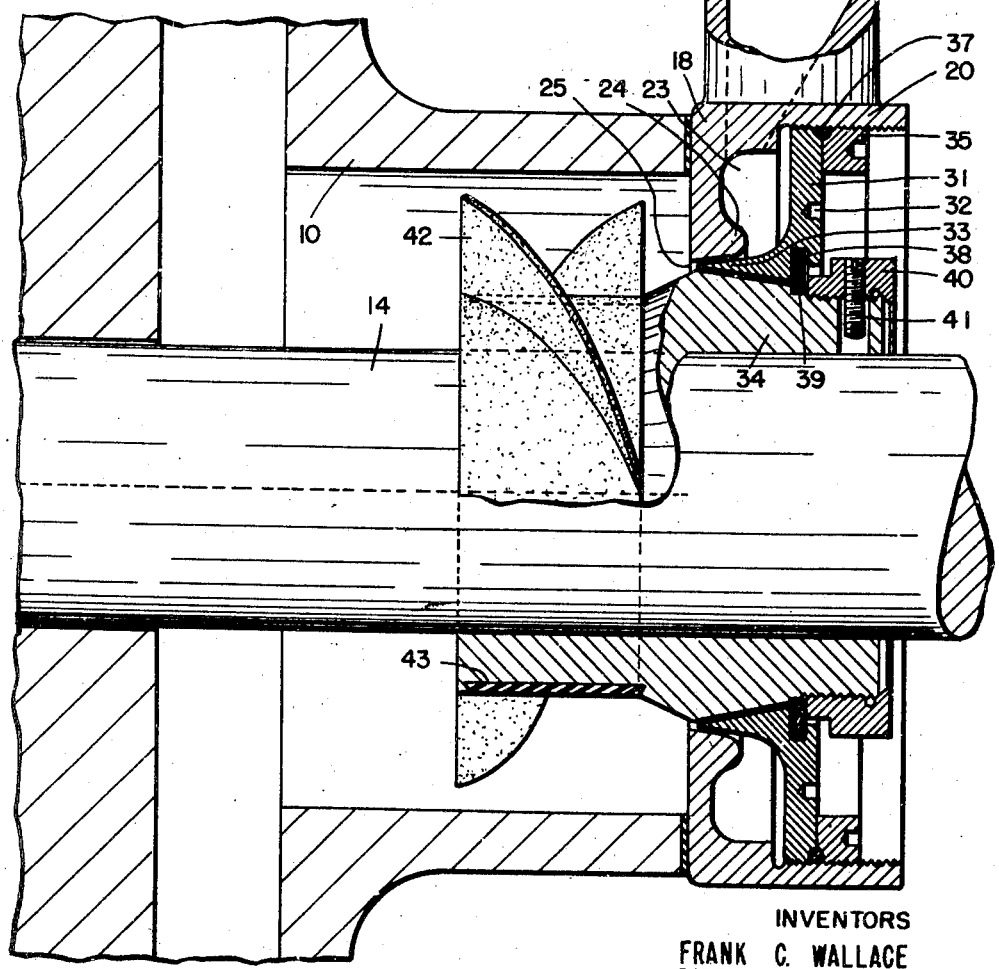
Fig. 3 is an enlarged fragmentary sectional view of the shaft seal area taken on the line 3—3 of Fig. 2.

In preparing the device for operation, the direction of shaft rotation is noted and the pipe 28 is connected from a high pressure zone into the seal housing 18 in a direction tangential thereto and preferably in the direction of shaft rotation, as indicated by the arrows in Fig. 2. Actually, however, the pipe 28 can be connected to either of the inlets 21 or 22 into the seal housing without seriously, or even noticeably in most instances, affecting the operation of the device. With the pump at rest, the jet adjusting plate 31 is screwed inwardly until it just engages the inner surface of the central opening 25 in the sealing ring housing 18 and then is backed off to provide the necessary clearance for the type of liquid to be handled.

The amount of this adjustment may be determined within sufficiently close limits after a brief experience with the device, and should take into consideration the grain size of any abrasive particles suspended in the liquid to avoid unnecessary abrasion of the parts. The greater the clearance at this point, however, the greater will be the loss of efficiency of the pump due to the bypass of liquid from the high to low pressure sides of the pump. This clearance should therefore be kept at the lowest practicable amount which will avoid abrasion or wear. Final slight adjustments of the jet adjusting plate 31 may be made while the pump is running. Endwise adjustment of the pump shaft 14 then may be made to adjust the clearance between the sleeve 34 and the inner tapered opening in the jet adjusting plate 31. It should be noted that the shaft 14 should be clear during the initial adjustment of the jet adjusting plate so that engagement of the jet adjusting flange with the wall of the central tapered opening 25 in the seal housing will be insured without possibility of being prevented by engagement of the sleeve 34 with the wall of the central opening in the jet adjusting plate 31.

After the clearances have been adjusted, the pump is operated. Slight adjustments of the jet flow may be made by turning the manually controlled valve 29. Liquid will flow under pressure from the high pressure zone through the pipe 28, the inlet 21 or 22 and into the annular chamber formed between the groove 23 and the jet adjusting plate 31. This liquid then will flow through the space between the tapered wall of the central opening 25 in the seal housing, and the tapered outer face of the jet flange 31, and thence into the low pressure area interiorly of the pump casing. As this liquid flows past the end of the jet plate flange 31 it creates a jet action which reduces the pressure and thereby produces a suction on the inner edge of the space between the inner side of the jet flange 33 and the sleeve 34.

Normally the suction through this space will not be sufficient to displace the sealing gasket 39 inwardly, and the sealing ring will remain sufficiently clear of the outer edge of this space to permit a slight suction flow of atmospheric air past the sealing ring and into this space, thereby keeping it clear of the liquid being pumped.

In the pumping of high viscosity liquids or those containing suspended or entrained solids, there is a tendency against flow which normally would tend to reduce the effectiveness of the jet action. In such cases the impeller 42, by producing an impelled flow of liquid axially of the pump shaft away from the inner edge of the jet opening, reduces back pressure in this zone and insures effective sealing action with a minimum of flow of liquid through the jet.

In case an extremely high pressure differential is developed through an excessively strong action of the jet, the sealing gasket 39 will be drawn against the inner side of its groove in the jet adjusting plate 31 and also against the offset portion of the sleeve 34 adjacent the inner end of its threads, so as to prevent access of atmospheric air into the interior of the pump.

When the pump is not in operation, the jet action of course ceases, and the pressure on the fluid interiorly of the pump casing is transmitted through the space between the inner surface of the flange 33 and the sleeve 34. This increased pressure is transmitted to the inner face of the sealing gasket 39, forcing it outwardly into sealing relation with the outer side of its groove 38 and the inner end of the clamp ring 40.

The device provides a satisfactory and efficient seal for the handling of the most corrosive liquids and highly viscous abrasive suspensions, and substantially increases efficiency and reduces shut downs for maintenance due to seal leakage.

While we have illustrated and described a preferred form of our invention, it will be apparent to those familiar with the art that the device is capable of several modifications without departing from the spirit of our invention. It is desired, therefore, not to limit the invention except as set forth in the following claims:

We claim:

1. A jet shaft seal comprising in combination with a rotary shaft, a low pressure liquid zone surrounding said shaft and a relatively high pressure zone, a seal housing surrounding said shaft and having an annular recess therein, a jet adjusting plate adjustably mounted in said housing, an annular flange on said jet adjusting plate, said flange being spaced inwardly from said housing to form a jet passage, and being spaced outwardly from said shaft to form a narrow annular passage normally open at its outer end to the atmosphere, and terminating at its inner end jointly with, and at an acute angle to, the jet passage, and a sealing ring spaced from said sealing passage in a direction axially outwardly along said shaft, said sealing ring being mounted loosely between a shaft element and a housing supporting member, said ring being normally free from sealing engagement with said shaft and housing supported member, said sealing ring being adapted to move under variations in pressure on opposite sides thereof into sealing engagement with said shaft and housing supported member.

2. A jet shaft seal comprising in combination with a rotary shaft, a low pressure liquid zone surrounding said shaft and a relatively high pressure zone, a seal housing surrounding said shaft and having an annular recess therein, a jet adjusting plate adjustably mounted in said housing, a tapered annular flange on said jet adjusting plate, said flange being spaced inwardly from said housing to form a jet passage, and being spaced outwardly from said shaft to form a narrow annular passage normally open at its outer end to the atmosphere, and terminating at its inner end jointly with, and at an acute angle to, the jet passage, and a sealing ring spaced outwardly from said sealing passage in a direction axially of said shaft.

3. A jet shaft seal comprising in combination with a rotary shaft, a low pressure liquid zone surrounding said shaft and a relatively high pressure zone, a seal housing surrounding said shaft and having an annular recess therein, said seal housing also having a tapered central aperture therein, a jet adjusting plate adjustably mounted in said housing, a tapered annular flange on said jet adjusting plate, said flange being spaced inwardly from said housing to form a jet passage of conical section with the tapered central opening in the seal housing, and being spaced outwardly from said shaft to form a narrow annular passage normally open at its outer end to the atmosphere, and terminating at its inner end jointly with, and at an acute angle to, the jet passage.

4. A jet shaft seal comprising in combination with a rotary shaft, a low pressure liquid zone surrounding said shaft and a relatively high pressure zone, a seal housing surrounding said shaft and having an annular recess therein, a jet adjusting plate adjustably mounted in said housing to enclose the recess in the seal housing and form therewith an annular passage openly communicating with the high pressure zone, an annular flange on said jet adjusting plate, said flange being spaced inwardly from said seal housing to form an annular jet passage therebetween, said jet passage being open on its inner end to the low pressure liquid zone, said flange being spaced outwardly from said shaft to form a narrow annular passage normally open at its outer end to the atmosphere, and terminating at its inner end jointly with, and at an acute angle to, the annular jet passage.

5. A jet shaft seal comprising in combination with a rotary shaft having a tapered portion thereon, a low pressure liquid zone surrounding said shaft and a relatively high pressure zone remote from said shaft, an annular seal housing surrounding said shaft and having an annular recess therein, a jet adjusting plate adjustably mounted in said housing to enclose the recess in the seal housing and form therewith an annular passage openly communicating with the high pressure zone, a tapered annular flange on said jet adjusting plate, said flange being spaced inwardly from said housing to form a jet passage, and being spaced outwardly from and radially opposite to the tapered portion of the shaft, to form a narrow annular passage therebetween, said passage being normally open at its outer end to the atmosphere, and intersecting at its inner end, and at an acute angle to, the jet passage in a conic intersection.

6. A jet shaft seal comprising in combination with a wall having an opening therein and adapted to have fluids at different pressures on opposite sides of said wall, a shaft rotatably mounted in said opening, said shaft having a tapered element within said opening, a cup-shaped seal housing mounted in said wall opening, said seal housing having a tapered opening of opposite taper to that of said shaft element and surrounding said tapered shaft element, a jet adjusting plate mounted for axial adjustment in the opening in said seal housing to surround said shaft, a tapered flange carried by said jet adjusting plate and having its opposite sides tapered to conform substantially to the tapers of the seal housing opening and the shaft element respectively to form a pair of conic intersecting annular passages intersecting at an annulus of juncture adjacent the low pressure side of the wall, an axial flow impeller mounted on said shaft adjacent said annulus of juncture, and a floating sealing ring mounted over the opposite end of the inner of said passages from said annulus of juncture, said sealing ring being normally in non-sealing condition and being free for movement by a predetermined unbalance of pressure on opposite sides thereof into sealing relation with said shaft and a wall supported element.

7. A jet shaft seal comprising in combination with a wall having an opening therein and adapted to have fluids at different pressures on opposite sides of said wall, a zone of relatively higher pressure remote from said wall opening, a shaft rotatably mounted in said opening, said shaft having a tapered element within said opening, a cup-shaped seal housing mounted in said wall opening, said seal housing having a tapered opening of opposite taper to that of said shaft element, a jet adjusting plate mounted for axial adjustment in said seal housing to surround said shaft and to enclose the cup-shaped housing to form an annular passage opening into the relatively higher pressure zone, a tapered flange carried by said jet adjusting plate and having its opposite sides tapered to conform to the tapers of the seal housing opening and the shaft element respectively to form a pair of conic intersecting annular passages terminating at an annulus of conic juncture adjacent the low pressure side of the wall, and an axial flow impeller mounted on said shaft on the low pressure side of said annulus of juncture.

8. A jet shaft seal comprising in combination with a wall having an opening therein and adapted to have fluids at different pressures on opposite sides of said wall, a shaft rotatably mounted in said opening, a tapered sleeve mounted around said shaft within said opening, an annular cup-shaped seal housing mounted to encircle said wall opening and the shaft therein, the central opening of said seal housing being tapered oppositely to said shaft sleeve, an annular jet adjusting plate threaded for axial adjustment in said seal housing to surround the tapered sleeve around said shaft, and a tapered flange carried by said jet adjusting plate and having its opposite sides tapered to conform to the tapers of the seal housing opening and the shaft element respectively and insertable therebetween to form a pair of angularly intersecting conic passages terminating at an annulus of juncture adjacent the low pressure side of said seal housing.

9. A jet shaft seal comprising in combination with a wall having an opening therein and adapted to have fluids at different pressures on opposite sides of said wall, a shaft rotatably mounted in said opening, a tapered sleeve adapted to be mounted around said shaft within said opening, a wall element surrounding said sleeve and having a tapered opening therein of opposite taper to that of said shaft sleeve, and jet adjusting means mounted for axial adjustment relatively to said sleeve and said tapered wall opening, said jet adjusting means including a tapered annular flange having its oposite sides tapered to conform to the tapers of the wall opening and the shaft sleeve respectively, to form a pair of angularly intersecting conic passages, intersecting at an annulus of juncture adjacent the low pressure side of the wall.

10. A jet shaft seal comprising in combination with a wall having an opening therein and adapted to have fluids at different pressures on opposite sides of said wall, a shaft rotatably mounted in said opening, a tapered sleeve adapted to be mounted around the shaft within said opening, an annular cup-shaped seal housing adapted to be mounted on the wall around said wall opening, said seal housing having a tapered opening of opposite taper to that of said shaft element, a jet adjusting plate mounted for axial adjustment in said seal housing to surround said shaft and to enclose said cup-shaped housing to form an annular passage therewith, a tapered flange carried by said jet adjusting plate and having its opposite sides tapered to conform to the tapers of the seal housing opening and the shaft element respectively and adapted to be inserted therebetween to form a pair of angularly intersecting conic passage intersecting at an annulus of juncture adjacent the low pressure side of the wall, and an axial flow impeller moulded on said sleeve axially offset from said annulus of juncture.

FRANK C. WALLACE.
ROBERT E. FOSTER.